H. B. BARTLETT.
WEIGHING MECHANISM.
APPLICATION FILED OCT. 3, 1919.

1,415,915.

Patented May 16, 1922.

INVENTOR
Henry B. Bartlett.
BY Chapin Neal
ATTORNEYS.

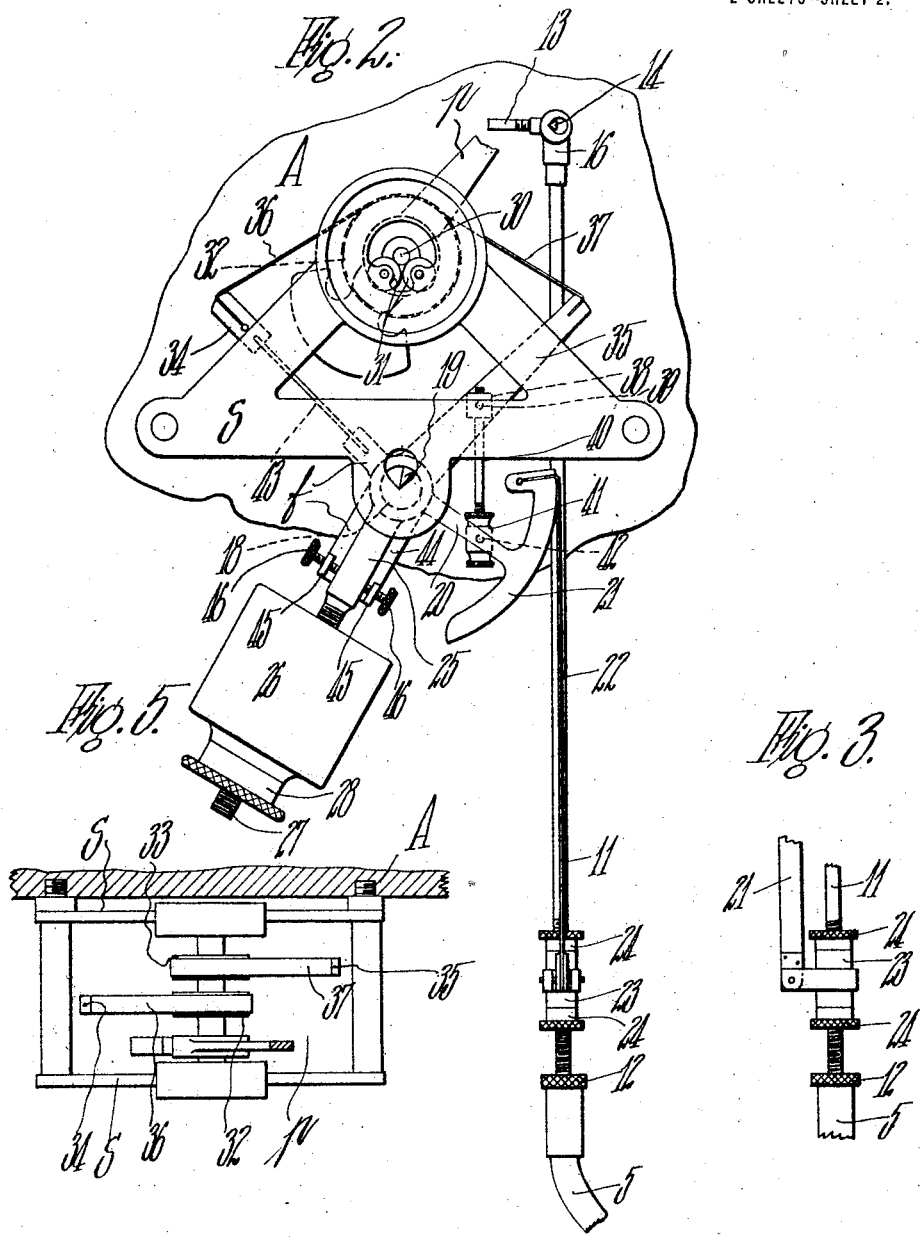

UNITED STATES PATENT OFFICE.

HENRY B. BARTLETT, OF HOLYOKE, MASSACHUSETTS, ASSIGNOR TO B. F. PERKINS & SON, INC., OF HOLYOKE, MASSACHUSETTS, A CORPORATION OF MASSACHUSETTS.

WEIGHING MECHANISM.

1,415,915.  Specification of Letters Patent.  Patented May 16, 1922.

Application filed October 3, 1919. Serial No. 328,247.

*To all whom it may concern:*

Be it known that I, HENRY B. BARTLETT, a citizen of the United States of America, residing at Holyoke, in the county of Hampden and State of Massachusetts, have invented certain new and useful Improvements in Weighing Mechanism, of which the following is a specification.

This invention relates to improvements in weighing mechanism and, more particularly, to mechanism of the type which includes a swinging pointer to traverse an arcuate scale.

Generally, in mechanism of this type, the angular extent of movement permitted to the pointer, and thus the angular extent of the scale, is definitely restricted by the use of knife edge pivots which ordinarily confine the swinging movement to substantially sixty degrees.

An object of this invention is to provide an improved mechanism of the type set forth, characterized in that the pointer is permitted a very much increased extent of angular movement.

A further object of the invention is to provide a weighing mechanism proper, which includes the desirable knife edge pivots, and to combine with such a mechanism motion multiplying devices to connect the mechanism to the scale, whereby the maximum angular movement permitted by the knife edge pivots may be substantially increased at the pointer.

Another object of the invention is to provide in a weighing mechanism, of the type set forth, an improved pivotal mounting suitable for use with the pointer for example and in other places where a large arc of swinging movement is desired and where the friction of the pivotal mounting must needs be minimized.

A further object of the invention is to provide, in a weighing mechanism, a specifically improved stabilizing device for the load-receiving member.

Other objects and advantages will appear in the following description and in the illustrative embodiment of the invention in the accompanying drawings, in which—

Fig. 2 is an enlarged fragmentary elevational view of the interior mechanism;

Fig. 3 is a side elevational view of a part of Fig. 2;

Fig. 5 is a fragmentary plan view of Fig. 3.

Figure 1:
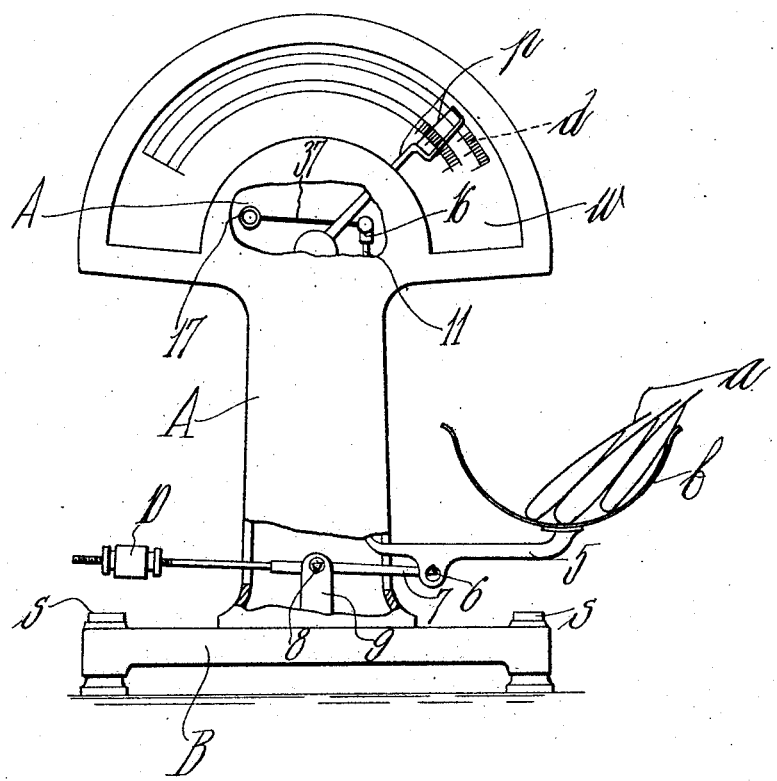
Fig. 1 is a front elevational view, with parts broken away, of a weighing mechanism embodying the invention.
Figure 4:
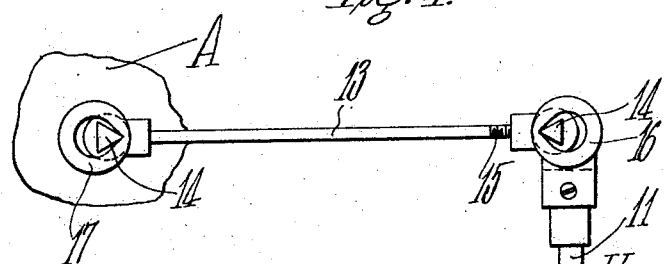
Fig. 4 is an enlarged elevational view of the stabilizing link.

Referring to these drawings; the weighing mechanism is largely contained within a hollow casing A which is supported by a suitable base B, preferably provided with levelling screws $s$, as indicated. The upper part of casing A is substantially semi-cylindrical and carries a suitably graduated scale $d$ which is visible from without the casing by reason of the provision of a window $w$ in the latter. A pointer $p$, mounted in a manner to be described, is adapted to swing along and adjacent scale $d$.

The article, as $a$, to be weighed is placed in a basket like load-receiving member $b$, which is suitably fixed to one end of a lever 5. The latter is supported, intermediate its ends, upon a knife edge 6 carried by one end of a second lever 7 which is pivoted intermediate its ends, by means of a knife edge 8, to a bracket 9 on base B. The other end of this lever carries a counterweight 10, preferably adjustable as shown.

That end of lever 7, opposite to the basket $b$, is curved upwardly and has fixed thereto an upwardly extending rod 11, which is vertically adjustable relatively to the lever 7 by reason of the screw thread connection shown, a lock nut 12 serving to hold the two connected members in adjusted position. The upper end of rod 11 is connected to frame A by a stabilizing link 13. Each end of link 13 carries a knife edge 14, and of these knife edges one is preferably adjustably connected to link 13, as by the screw thread 15, whereby the effective length of the link may be varied, as desired. The rod 11 carries a suitable forked member 16 suitably constructed to receive the adjacent knife edge 14 and the other knife edge is received in a similar member 17, which is fixed to frame A. The distance between the two knife edges 14 is equal to that between the knife edges 6 and 8 and the distance between the knife edge 6 and the right-hand knife edge 14 is equal to that between the knife edge 8 and the left-hand knife edge 14. Thus, the link 13 and lever 7 move in parallelism and rod 11 cannot move unless lever 7 is moved.

The weighing mechanism proper is mounted in a subframe S suitably secured to and within the hollow casing A. It includes a pivot shaft 18 supported at its ends by knife edges 19 from the subframe S. Fixed on shaft 18 is an arm 20 carrying a segment 21 to which is attached a flexible ribbon or tape 22. The latter is fastened at its lower end to rod 11, preferably, by means of a member 23 which is adjustable on the threaded portion of rod 11 and may be held in adjusted position by means of lock nuts 24. A depression of lever 7 will thus rock shaft 18 in a clockwise direction. The shaft 18 also carries an arm 25 upon which is mounted a weight 26, preferably adjustable as indicated by the screw thread 27 and nut 28. The weight 26, of course, determines the degree of angular movement of shaft 18 for any given load placed in basket $b$.

The structure, thus far described, may be varied in numerous particulars and yet embody the invention, which is more particularly concerned with the provision of means to multiply the angular movement of shaft 18 so that the pointer $p$ may swing over the desired wide arc. The wide arc of movement is desired, for, with any given length of pointer $p$, the length of the scale may be increased so that it may be read with improved accuracy. Were the pointer fixed directly to shaft 18 and the same spacing between the graduations on scale $d$ retained, the pointer would need to be very much longer.

According to the present invention, the pointer $p$ is mounted separately and at a distance from shaft 18 and is supported for swinging movement by special bearings which permit the wide arc of movement. Thus, pointer $p$ is secured to a shaft 30 and the ends of the latter are each supported by and between a pair of rolls 31 which are suitably mounted in the upper portion of the subframe S. The shaft 30 is held merely by gravity to the rolls 31 and contacts therewith merely at two points. This construction permits a very wide arc of movement of the pointer $p$ and without presenting a great amount of friction. While such construction, if used as a substitute for knife edges 19, would not be as desirable, the situation is different when used for the pointer arm, for the latter is very light as compared to the segment arm 20, weight arm 25, weight 26 and so forth.

The connecting means between the shafts 18 and 30 involve two drums 32 and 33 fixed on the latter, two levers 34 and 35 movable with shaft 18 and flexible ribbons or tapes 36 and 37 which connect the drums with their respective levers. The arms 34 and 35 are of equal length and drums 32 and 33 are of the same diameter. The ratio between the length of these arms and the radii of the drums determines the degree of increase of angular movement of pointer $p$ over shaft 18. As shown, pointer $p$ is movable over through an angle substantially twice as large as that through which shaft 18 is movable, a condition obviously impractical without the motion multiplying means.

As to the details of the latter, the arm 35 is preferably not fixed directly to shaft 18. Rather, it is loosely mounted on the latter for angular adjustment, whereby the tapes 36 and 37 may be tightly drawn up to prevent lost motion in the connections between shafts 18 and 30. To hold arm 35 in its various positions of adjustment, it is adjustably connected to the segment arm 20. Thus, a block 38 is connected to arm 35 by a horizontal pivot 39 and this block is internally screw threaded to receive an end of a threaded rod 40. The latter extends substantially vertically downward and passes loosely through a similar block 41 pivoted at 42 to arm 20. Nuts 43, one on each side of block 42 hold the latter and rod 40 against relative movement.

The other arm 34 preferably has a portion which is flexible and resilient, as the part 43 which is made of thin spring metal. This construction allows the tapes 36 and 37 to be tightly drawn up by the adjustment just described without danger of binding, for the arm 34 may yield slightly. Furthermore, the spring member 43 is desirably deflected to some degree for, by so doing, the member acts constantly to take up such lost motion as may from time to time occur.

The weight arm 25, described as carried by shaft 18, is desirably adjustably fixed thereto so that its angular position, relatively to the arm 20 and levers 34 and 35, may be varied when desired. To accomplish this object, the lever 34, just described, is fixed to shaft 18 and provided with an extension 44, which substantially parallels arm 25 and lies closely adjacent thereto. The extension 44 carries two parallel projections 45 which extend at right angles to member 44 into the path of arm 25. The projections 45 are disposed one on each side of arm 25 and each carry a screw 46, which is moved to engage arm 25. The arm 25 is thus securely held against movement relatively to arm 34 and yet may be angularly adjusted relatively thereto when desired.

The operation of the weighing mechanism will sufficiently appear from the foregoing description for the only essential difference in operation between the mechanism described and the usual weighing mechanism is that the pointer $p$ is not directly operated from the shaft which carries the weight arm. Such shaft is connected to the pointer shaft in a manner to multiply its motion and this is obtained without the use of gears, or the like, which would not only present undue friction, but also lost motion. The tapes 36 and 37 connect the two shafts without lost motion and a minimum of friction. Thus, the pointer, although of relatively small length, may be made to traverse a wide arc and the entire weighing mechanism may be made small and compact.

The invention has been disclosed herein, in an embodiment at present preferred, for the purposes of illustration, but the scope of the invention is defined by the appended claims rather than by the foregoing description.

What I claim is—

1. In a weighing mechanism, a weight arm pivoted on a knife edge for swinging movement, a load-receiving member connected to swing such arm, a pointer arm separately pivoted for swinging movement in a plane parallel to that of the weight arm, and means connecting the weight arm pivot and pointer pivot including drums on one and arms on the other pivot and flexible tapes connecting each drum to its respective arm, each tape being secured at one end to one of the drums and at its opposite end to one of the arms.

2. In a weighing mechanism, a weight arm, knife edge supporting means therefor, a second arm supported by said means for swinging movement with the weight arm, a load-receiving member connected to the second arm, a pointer arm, a shaft therefor, two angularly spaced arms carried by said supporting means and located one on each side of said shaft, a drum on the latter for each arm, and a flexible tape connecting each arm to its respective drum, the radius of each drum being less than the length of its arm.

3. In a weighing mechanism, a weight arm, knife edge supporting means therefor, a second arm supported by said means for swinging movement with the weight arm, a load-receiving member connected to the second arm, a pointer arm, a shaft therefor, pairs of rolls upon which the ends of said shaft are supported, two angularly spaced arms carried by said supporting means and located one on each side of said shaft, a drum on the latter for each arm, and a flexible tape connecting each arm to its respective drum, the radius of each drum being less than the length of its arm.

4. In a weighing mechanism, a weight arm, knife edge supporting means therefor, a second arm supported by said means for swinging movement with the weight arm, a load-receiving member connected to the second arm, a pointer arm, a shaft therefor, two angularly spaced arms carried by said supporting means and located one on each side of said shaft, a drum on the latter for each arm, a flexible tape connecting each arm to its respective drum, the radius of each drum being less than the length of its arm, and means to angularly adjust one of the two last-named arms relatively to said second arm and weight arm, whereby said tapes may be tightened.

5. In a weighing mechanism, a weight arm, knife edge supporting means therefor, a second arm supported by said means for swinging movement with the weight arm, a load-receiving member connected to the second arm, a pointer arm, a shaft therefor, two angularly spaced arms carried by said supporting means and located one on each side of said shaft, a drum on the latter for each arm, a flexible tape connecting each arm to its respective drum, the radius of each drum being less than the length of its arm, and means to angularly adjust said weight arm relatively to said knife edge supporting means.

6. In a weighing mechanism, a weight arm, knife edge supporting means therefor, a second arm supported by said means for swinging movement with the weight arm, a load-receiving member connected to the second arm, a pointer arm, a shaft therefor, two angularly spaced arms carried by said supporting means and located one on each side of said shaft, a drum on the latter for each arm, and a flexible tape connecting each arm to its respective drum, the radius of each drum being less than the length of its arm, one of the two last-named arms having a flexible and resilient portion.

7. In a weighing mechanism, a frame, a lever pivoted intermediate its ends thereto, a second lever pivoted to the first lever near one end thereof, a load-receiving member carried by one end of the second lever, a weight arm pivoted at a distance above said levers, a pointer, means for actuating said pointer from said weight arm, said second lever having its other end extended vertically upwards toward said weight arm, flexible means connecting the latter to the extended portion of the second lever, a stabilizing link connecting such portion to said frame and arranged to swing in parallelism with the first-named lever.

8. In a weighing machine, a weight-arm, knife edge supporting means therefor, a second arm supported by said means for swinging movement with the weight arm, a load receiving member connected to the second arm, a pointer arm, a shaft therefor, two angularly spaced arms carried by said supporting means and located one on each side of said shaft, a drum on the latter for each arm, a flexible tape connecting each arm to its respective shaft, and means for angularly adjusting one of said arms whereby the said tapes will be properly tensioned.

HENRY B. BARTLETT.